(12) United States Patent
Taimouri et al.

(10) Patent No.: US 10,466,714 B2
(45) Date of Patent: Nov. 5, 2019

(54) DEPTH MAP ESTIMATION WITH STEREO IMAGES

(71) Applicant: Ford Global Technologies, LLC, Dearborn, MI (US)

(72) Inventors: Vahid Taimouri, Dearborn Heights, MI (US); Michel Cordonnier, Ann Arbor, MI (US); Kyoung Min Lee, Ypsilanti, MI (US); Bryan Roger Goodman, Northville, MI (US); Gintaras Vincent Puskorius, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/254,212

(22) Filed: Sep. 1, 2016

(65) Prior Publication Data

US 2018/0059679 A1   Mar. 1, 2018

(51) Int. Cl.
*G05D 1/02* (2006.01)
*G05D 1/00* (2006.01)
*G06N 3/04* (2006.01)
*G06N 3/08* (2006.01)
*G06T 7/593* (2017.01)
*G06T 7/50* (2017.01)

(52) U.S. Cl.
CPC ......... *G05D 1/0248* (2013.01); *G05D 1/0088* (2013.01); *G06N 3/04* (2013.01); *G06N 3/0454* (2013.01); *G06N 3/08* (2013.01); *G06N 3/084* (2013.01); *G06T 7/50* (2017.01); *G06T 7/593* (2017.01); *G06T 2207/10012* (2013.01); *G06T 2207/20084* (2013.01); *G06T 2207/30252* (2013.01)

(58) Field of Classification Search
USPC .......................................................... 701/27
See application file for complete search history.

(56) References Cited

U.S. PATENT DOCUMENTS

| 8,234,234 B2 | 7/2012 | Shearer |
| 8,411,932 B2 | 4/2013 | Liu et al. |
| 9,007,197 B2 | 4/2015 | Breed |

(Continued)

FOREIGN PATENT DOCUMENTS

GB   2387585 A   10/2003

OTHER PUBLICATIONS

Ruirui Li, Wenjie Liu, Lei Yang, Shihao Sun, Wei Hu*, Fan Zhang, DeepUNet: A Deep Fully Convolutional Network for Pixel-level Sea-Land Segmentation Senior Member, IEEE Beijing University of Chemical Technology Beijing, China (hereinafter "Li NPL") (https://arxiv.org/pdf/1709.00201.pdf).*

(Continued)

*Primary Examiner* — Jean Paul Cass
(74) *Attorney, Agent, or Firm* — Frank A. MacKenzie; Bejin Bieneman PLC

(57) ABSTRACT

Vehicles can be equipped to operate in both autonomous and occupant piloted mode. While operating in either mode, an array of sensors can be used to pilot the vehicle including stereo cameras and 3D sensors. Stereo camera and 3D sensors can also be employed to assist occupants while piloting vehicles. Deep convolutional neural networks can be employed to determine estimated depth maps from stereo images of scenes in real time for vehicles in autonomous and occupant piloted modes.

14 Claims, 9 Drawing Sheets

(56) References Cited

U.S. PATENT DOCUMENTS

| | | | |
|---|---|---|---|
| 9,224,060 B1* | 12/2015 | Ramaswamy | G06K 9/00912 |
| 9,269,012 B2* | 2/2016 | Fotland | G06K 9/3241 |
| 9,626,566 B2* | 4/2017 | Versace | G06K 9/00664 |
| 9,671,328 B2* | 6/2017 | Retterath | G08G 1/096758 |
| 9,672,609 B1* | 6/2017 | El Dokor | G06K 9/00201 |
| 9,711,126 B2* | 7/2017 | Mehra | G10K 11/04 |
| 9,760,690 B1* | 9/2017 | Petkov | G06T 15/08 |
| 9,892,496 B2* | 2/2018 | Barron | G06K 9/469 |
| 2002/0022927 A1 | 2/2002 | Lemelson et al. | |
| 2007/0005609 A1 | 1/2007 | Breed | |
| 2010/0057305 A1 | 3/2010 | Breed | |
| 2014/0063054 A1* | 3/2014 | Osterhout | G06F 3/005 |
| | | | 345/633 |
| 2014/0079297 A1* | 3/2014 | Tadayon | G06K 9/00 |
| | | | 382/118 |
| 2014/0201126 A1* | 7/2014 | Zadeh | G06N 7/005 |
| | | | 706/52 |
| 2014/0368807 A1* | 12/2014 | Rogan | G01S 17/50 |
| | | | 356/28 |
| 2015/0055821 A1* | 2/2015 | Fotland | G06K 9/3241 |
| | | | 382/103 |
| 2015/0077323 A1* | 3/2015 | Ramaswamy | G06F 3/012 |
| | | | 345/156 |
| 2016/0026253 A1* | 1/2016 | Bradski | G02B 27/225 |
| | | | 345/8 |
| 2016/0054452 A1 | 2/2016 | Cosatto et al. | |
| 2016/0078339 A1* | 3/2016 | Li | G06N 3/084 |
| | | | 706/20 |
| 2017/0076304 A1* | 3/2017 | Toth | G06Q 30/0202 |
| 2017/0148222 A1* | 5/2017 | Holzer | H04N 13/243 |
| 2017/0169705 A1* | 6/2017 | Mortazavi | G01C 21/3492 |
| 2017/0220879 A1* | 8/2017 | Nakamura | G06T 7/00 |
| 2017/0237899 A1* | 8/2017 | Wexler | H04L 65/4069 |
| | | | 348/207.11 |
| 2017/0256254 A1* | 9/2017 | Huang | G10L 15/02 |
| 2017/0259801 A1* | 9/2017 | Abou-Nasr | B60W 10/18 |
| 2017/0300059 A1* | 10/2017 | Rust | G01S 17/89 |
| 2017/0300763 A1* | 10/2017 | Zou | G06K 9/00798 |
| 2017/0300767 A1* | 10/2017 | Zou | B60R 1/00 |
| 2017/0300813 A1* | 10/2017 | Lee | G06N 3/0454 |
| 2017/0301108 A1* | 10/2017 | Estrada | G06T 7/344 |
| 2017/0301109 A1* | 10/2017 | Chan | G06K 9/0063 |
| 2018/0059679 A1* | 3/2018 | Taimouri | G05D 1/0088 |
| 2018/0204111 A1* | 7/2018 | Zadeh | G06N 3/0436 |

OTHER PUBLICATIONS

Pandey et al., "Automatic Targetless Extrinsic Calibration of a 3D Lidar and Camera by Maximizing Mutual Information", Proceedings of the Twenty-Sixth AAAI Conference on Artificial Intelligence; © 2012 Association for the Advancement of Artificial Intelligence; www.aaai.org, 7 pages.

Huval et al., "An Empirical Evaluation of Deep Learning on Highway Driving", arXiv:1504.01716v3 [cs.RO], Apr. 17, 2015 (7 pages).

Mayer et al., "A Large Dataset to Train Convolutional Networks for Disparity, Optical Flow, and Scene Flow Estimation", arXiv:1512.02134v1, [cs.CV], Dec. 7, 2015, 14 pages.

Tsin, "Kernel Correlation as an Affinity Measure in Point-Sampled Vision Problems", Sep. 2003, CMU-RI-03-36.

* cited by examiner

DEPTH MAP ESTIMATION WITH STEREO IMAGES

BACKGROUND

Vehicles can be equipped to operate in both autonomously piloted and occupant piloted mode. While operating in autonomous mode, an array of sensors can be used to pilot the vehicle including sensors which can produce a 3D range or depth map. Depth maps can also be employed in occupant piloted mode to assist occupants in piloting vehicles. Depth maps can be acquired by processing pairs of stereo images, for example.

DETAILED DESCRIPTION

The state of the art depth map estimation algorithms, e.g. stereo matching, rely on stereo images to compute the distance to the surrounding objects in a scene. Stereo matching algorithms extract features in a pair of stereo images, detect corresponding features in the pair of images, and finally estimate the depth or range to the features by computing stereo disparity of the features.

Figure 2:
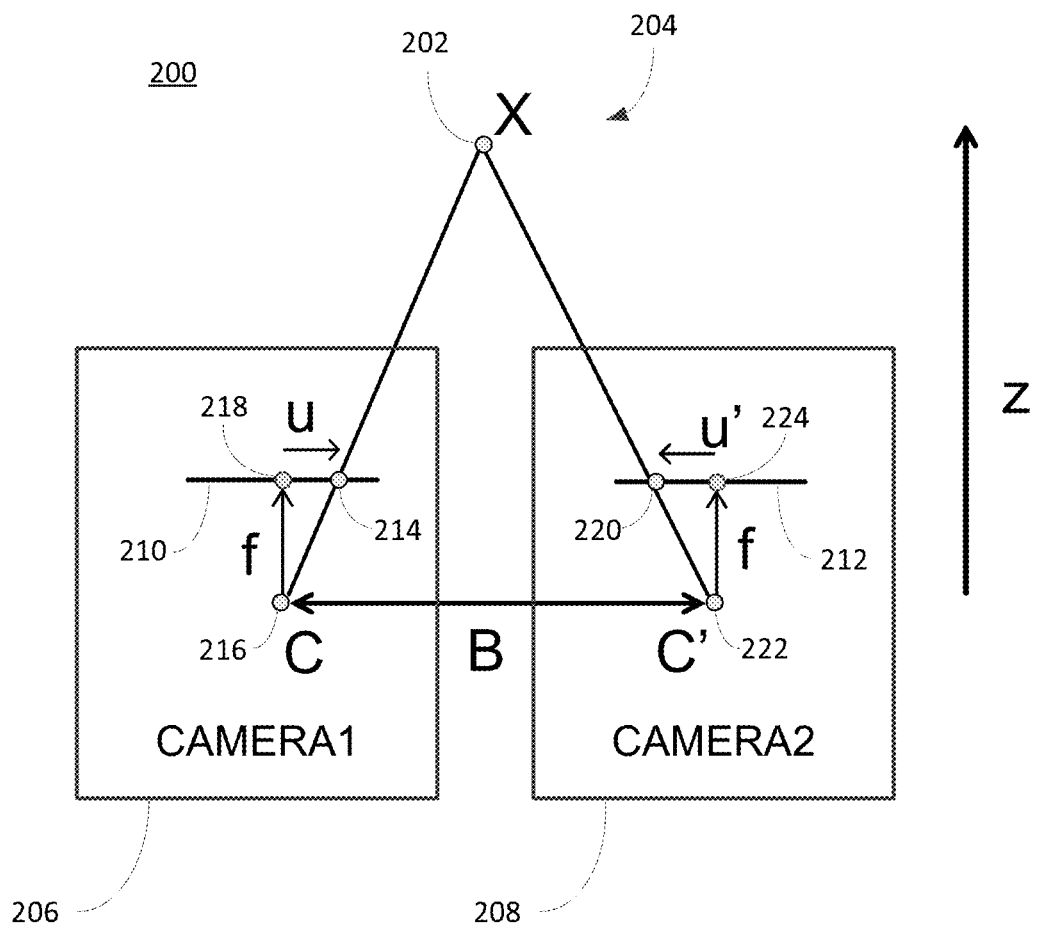
FIG. 2 is a diagram of prior art depth map estimation using stereo matching.

FIG. 2 is a diagram of prior art depth map estimation using stereo disparity 200. A stereo disparity is the amount horizontal distance between the projection points 214, 220 of an object, e.g. point X 202, onto two stereo images 210, 212. FIG. 2 includes a point X 202 in a scene 204 imaged by a pair of stereo cameras camera1 206 and camera2 208. Point X 202 is projected onto camera1 206 image detector 210 to form a left point 214 and onto camera2 208 image detector 212 to form right point 220. Camera1 206 also has an optical center C 216 at focal distance f from image detector 210 while camera2 208 has an optical center C' 222 at focal distance f from image detector 212.

Optical centers C and C' form a baseline B. The projection of optical center C 216 onto image detector 210 forms left center point 218 and the projection of optical center C' 222 onto image detector 212 forms right center point 224. The distances u and u' can be determined from the displacements of left point 214 from left center point 218 and right point 220 from right center point 224. Stereo disparity SD, defined as SD=u−u' can be related to the distance Z of point X 202 from optical centers C, C' by equation (1):

$$SD = u - u' = \frac{B * f}{Z} \qquad (1)$$

Features that can be matched to calculate stereo disparity and thereby range or depth can include visual edges in the stereo image pair, for example. Multiple features can be detected and stereo disparity calculated for each feature pair and interpolated to determine depth. Other techniques, e.g. block matching algorithms, for estimating depth from stereo images include dividing each stereo pair of images into pairs of blocks or windows and matching each pair of windows to determine stereo disparity.

Figure 3:
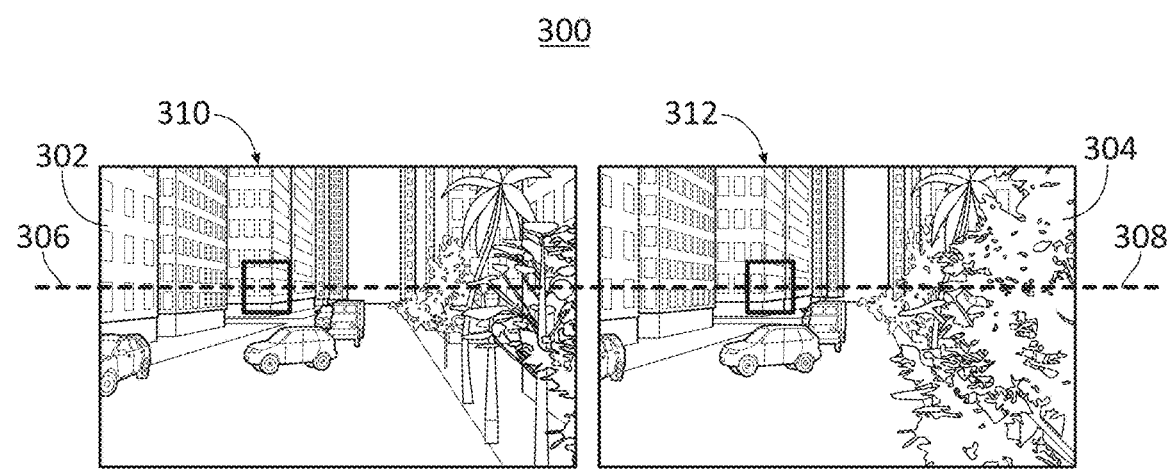
FIG. 3 is a diagram of stereo matching process on the epipolar line 306, 308 in the stereo images.

FIG. 3 shows a prior art technique for depth map estimation 300 using a pair of stereo images 302, 304. Stereo disparity can be calculated on a pixel-by-pixel basis along an epipolar lines 306, 308 passing through both stereo images 302, 304. Epipolar lines 306, 308 are the projection on each stereo image 302, 304 of lines passing between the optical centers C, C' 216, 222, respectively and a point X 202 to be estimated. Each pixel to be estimated will have an epipolar line 306, 308 in the other stereo image 302, 304.

Stereo disparity can be determined by comparing each pixel from a first stereo image 302 with pixels on the epipolar line 308 from the second stereo image 304 to determine a match and vice versa. Determining a match can include minimizing a cost or difference function between the pixels. Determining the displacement of a pixel along epipolar lines 306, 308 in stereo images 302, 304 can determine stereo disparity of the pixel.

Another known technique for depth map estimation 300 using a pair of stereo images 302, 304 uses windows 310, 312. Similar windows 310, 312 can be matched between stereo images 302, 304 and the displacement between matched windows 310, 312 used to determine stereo disparity. Matching windows can provide a more accurate measure of stereo disparity than matching pixels due to the improved statistical nature of matching multiple pixels instead of a single pixel, for example. Matching algorithms can use correlation-based techniques or sum of squared differences to determine stereo disparity.

Matching windows 310, 312 between pairs of stereo images 302, 304 can include determining similarity between the windows 310, 312. Determining similarity can include block matching using different similarity measures, e.g. sum squared differences according to equation (2), $$E(x,y;d) = \Sigma_{(x',y') \in N(x,y)} [I_L(x'+d,y') - I_R(x',y')]^2, \qquad (2)$$

where similarity measure E is a function of the window N centered at point (x,y) and the distance d between two windows in two stereo images 302, 304. The similarity measure in equation (2) is the sum of squared differences between intensity values $I_L$ and $I_R$ of the pixels in two windows 310, 312 from left stereo image 302 and right stereo image 304. The two windows centers have an offset along the epipolar line, parallel with the X-axis in this case, by an amount equal to d which is proportional to the estimated stereo disparity.

Figure 4:
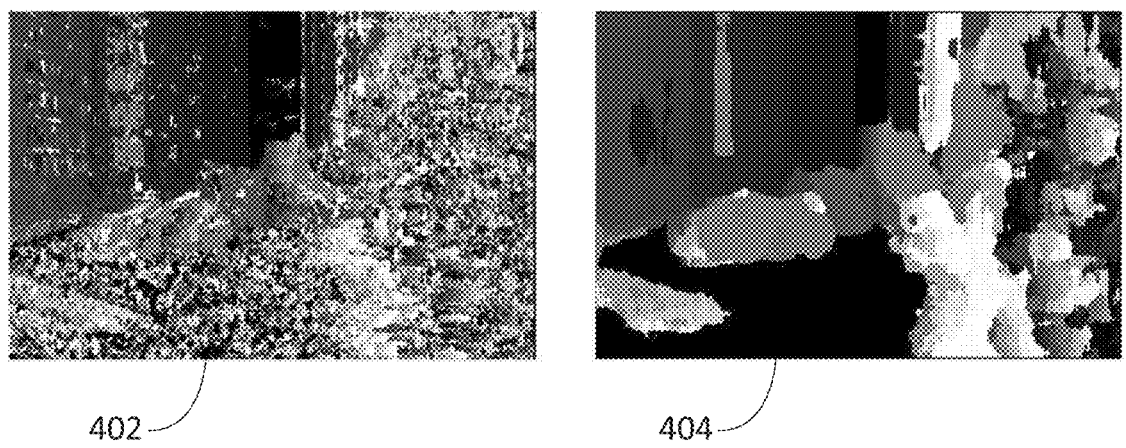
FIG. 4 is a diagram of the sensitivity of the traditional stereo matching algorithms for different windows sizes.

A parameter associated with determining stereo disparity and thereby depth is the size of the windows 310 312. FIG. 4 is a diagram of prior art depth maps 402, 404 determined by equation (2), where depth map 402 was determined with a window size of three pixels and depth map 404 was determined with a window size of 10 pixels. Determination of depth maps using equation 2 is very dependent upon choice of window size, and cannot be determined in real time with computing device 115 in FIG. 1.

Figure 1:
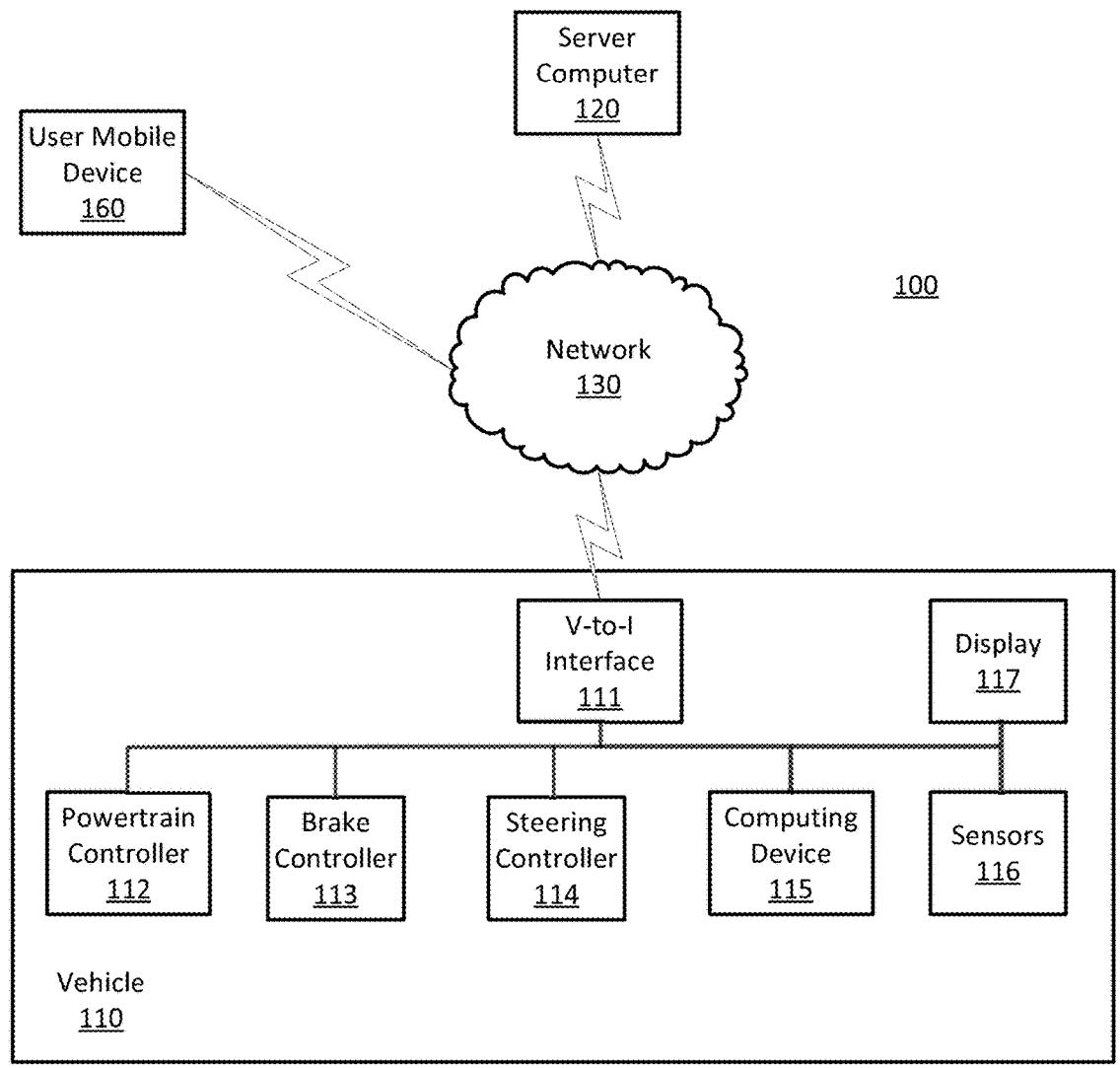
FIG. 1 is a diagram of a vehicle in accordance with disclosed implementations.

FIG. 1 is a diagram of a vehicle information system 100 that includes a vehicle 110 operable in autonomous and occupant piloted mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as are known. Computing device can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may be communicatively connected to, and receive instructions from, the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or neighboring vehicles 110.

The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110. Information from the sensors 116 can be input to computing device 115 to detect and classify objects such as pedestrians, vehicles, cyclists, animals, traffic signs and traffic lights, construction signs, and lane markers. Vehicle 110 can also include a display 117 operatively connected to computing device 115 to display depth maps and other information to assist occupant in piloting vehicle 110 in occupant-piloted mode.

Figure 5:
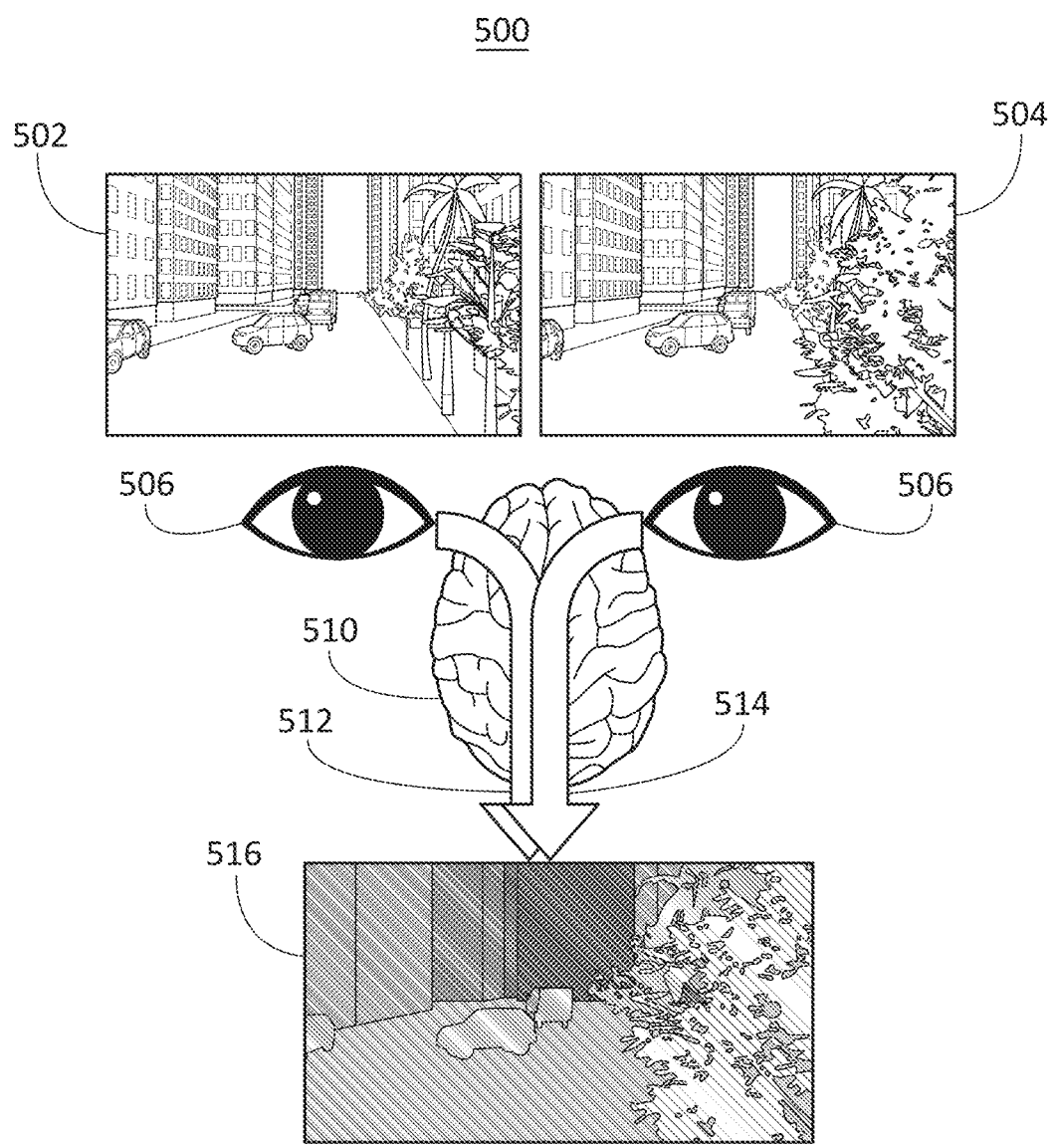
FIG. 5 is a diagram of depth map estimation performed by the human brain, which shows the deep neural networks capability for depth map estimation.

Aspects of disclosed implementations can be described with reference to FIG. 5. FIG. 5 is a diagram of human eyes 506, 508 viewing a pair of stereo images 502, 504, and relaying 512, 524 the information viewed to the brain 510, where the brain 510 synthesizes an internal depth map 516 from the stereo images 502, 504. The human brain performs this activity continuously without much thought. As disclosed herein, a convolutional deep neural network (CDNN) of a type that can perform simple visual tasks can be programmed to learn how to determine depth maps from stereo images 502, 504.

Figure 6:
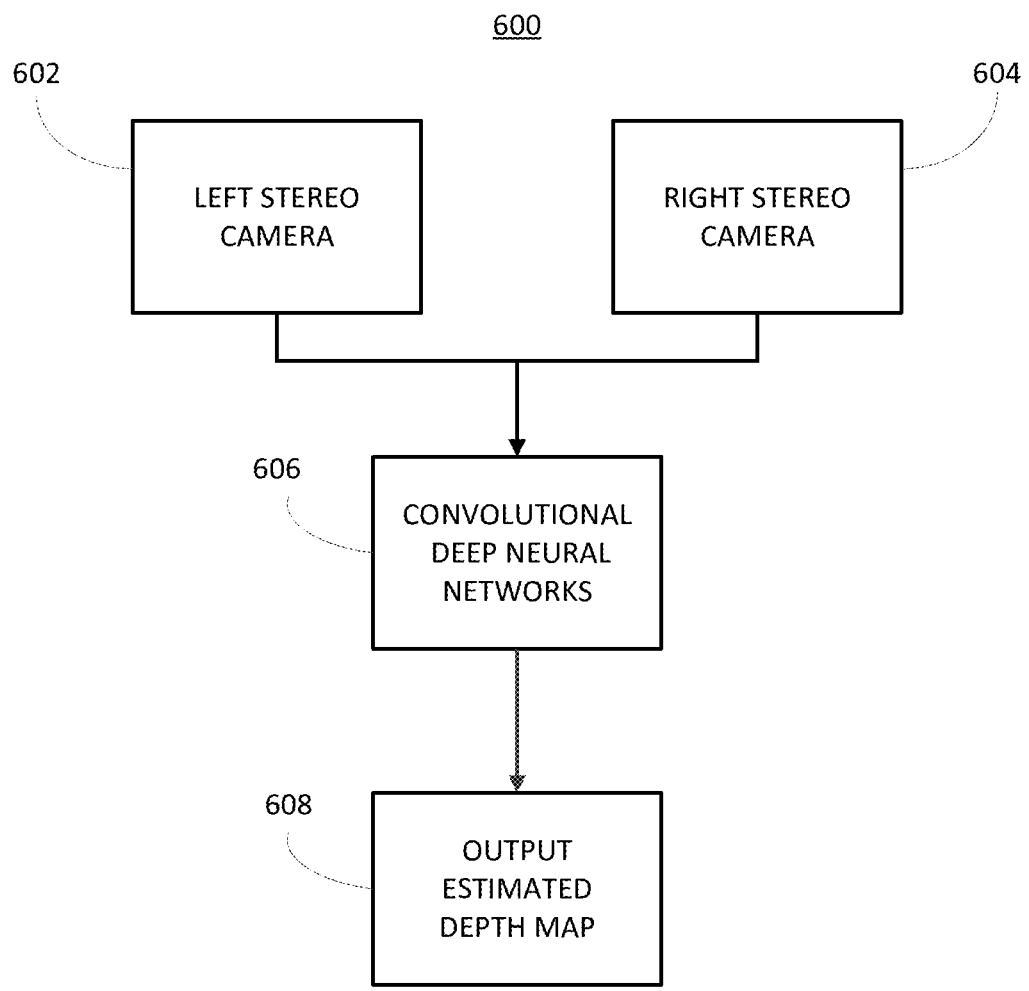
FIG. 6 is a diagram of a convolutional deep neural network (CDNN) system for depth map estimation in accordance with aspects of disclosed implementations.

FIG. 6 is a system 600 for determining depth maps using stereo images that includes a left stereo camera 602 and right stereo camera 604. Left and right stereo cameras 602, 604 send left and right stereo images to CDNN 606, where CDNN 606 processes left and right stereo images to estimate depth map. Estimated depth map is then output at step 608 to computing device 115 to pilot vehicle 110. System 600 can be implemented with any deep learning framework, e.g. Caffe, Tensorflow, or CNTK. System 600 is implemented herein with Caffe, a known neural network framework created by Berkeley Vision and Learning Center and by community contributors, described at http://caffe.berkeleyvision.org/.

Figure 7:
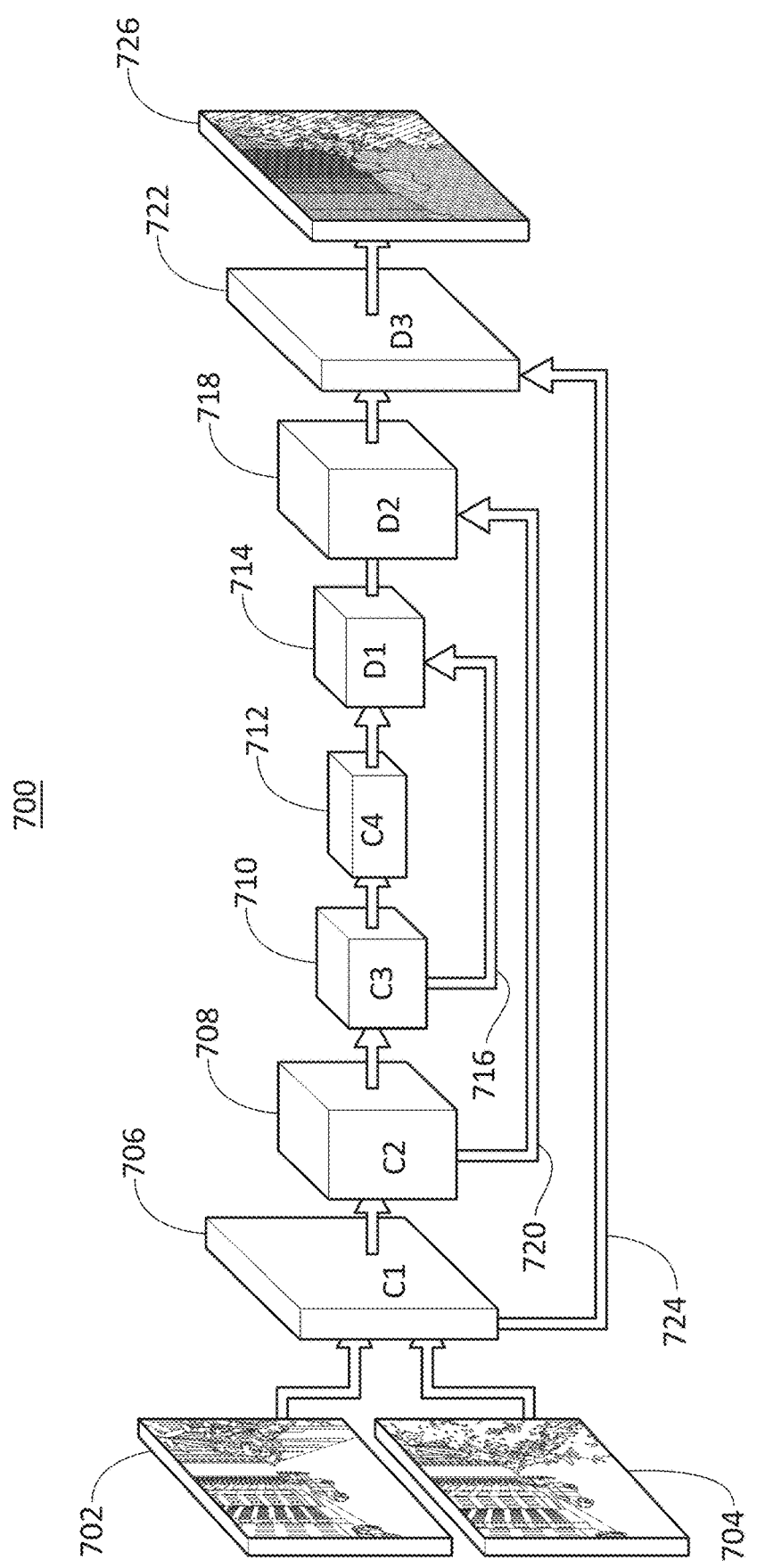
FIG. 7 is a is a diagram of a CDNN system for depth map estimation in accordance with aspects of disclosed implementations.

Implementing system 600 using the Caffe framework can yield a deep convolutional neural network 700 of FIG. 7 including multiple layers 706, 708, 710, 712, 714, 718, 722, wherein one or more of which can determine stereo disparity and thereby depth maps from the input data using various similarity measures such as cross-correlation. Deep convolutional neural network 700 can be trained to determine stereo disparity and thereby depth maps by comparing depth maps to ground truth. Training can include selecting parameters including cross-correlation kernels based on comparing depth maps to ground truth and back propagating the results to select parameters that minimize error, for example.

For example, determination of stereo disparity with cross-correlation can include forming a cross-correlation kernel using pixels from a window at a predetermined size and location within one of stereo images 702, 704 and cross-correlating the kernel so formed with the other of the stereo images 702, 704. The location of the point of maximum value of the correlation coefficient along an epipolar line can form a basis for stereo disparity, for example.

Training can include selecting parameters such as window size and window location and parameters related to cross-correlation such and maximum value location. Results of stereo disparity determination can be interpreted as a depth map and compared to ground truth at the appropriate resolution. Sets of parameters can be ranked based on errors generated by the comparison to ground truth. Parameters can be retained or discarded based on ranking.

FIG. 7 is a diagram of convolutional deep neural network (CDDN) 606 in more detail. CDDN 700 includes inputting a pair of stereo images 702, 704 to a first CDNN layer C1 706. First CDNN layer C1 706 can be trained by process 900 of FIG. 9 to determine stereo disparity for stereo training images from scenes similar to scenes represented by stereo images 702, 704. First CDNN layer C1 706 can include a maximum pooling CDNN layer that pools values over a window by taking the maximum value as representative of the window, for example.

Maximum pooling can reduce the resolution of stereo images 702, 704 thereby effectively increasing window size depending upon the amount of reduction in resolution. Maximum pooling is a technique for reducing resolution that can select a window size and set the value of all pixels within the window to the value of the window's maximum pixel value, for example. In this manner, stereo images 702, 704 can be re-sampled at a lower resolution while still retaining maximum value information.

First CDNN layer C1 706 can reduce the resolution stereo images 702, 704 by maximum pooling and determining stereo disparity results by forming a kernel from one of the stereo images 702, 704 and cross-correlating it with the other of the stereo images 702, 704, for example. The cross correlation can determine stereo disparity to forward propagate onto second CDNN layer C2 708.

Figure 9:
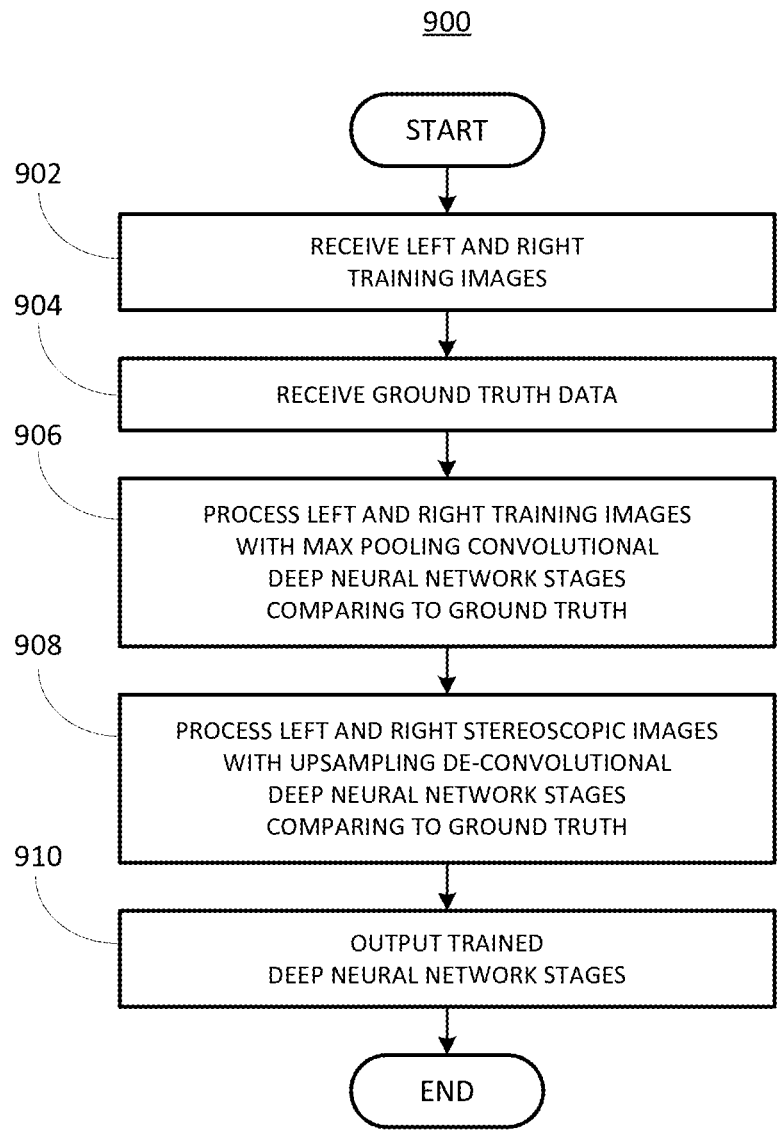
FIG. 9 is a flowchart diagram of a process to train a CDNN to determine a depth map for piloting a vehicle in accordance with aspects of disclosed implementations.

In similar fashion to first CDNN layer C2 706, second CDNN layer C2 708 can be trained by process 900 of FIG. 9 to determine stereo disparity for stereo training images from scenes similar to scenes represented by stereo images 702, 704 at reduced resolution using maximum pooling. Second CDNN layer C2 708 can reduce the resolution of stereo images 702, 704 and stereo disparity input from CDNN layer C1 706 by maximum pooling, determine stereo disparity of the stereo image 702, 704 using cross-correlation, for example and combine the determined stereo disparity with the input stereo disparity to forward propagate onto the third CDNN layer C3 710.

In similar fashion to first and second CDNN layer C2 708, third CDNN layer C3 710 can be trained to determine stereo disparity stereo images 702, 704 from scenes similar to stereo training images at appropriately reduced resolution using maximum pooling. Third CDNN layer 710 determines stereo disparity at reduced resolution and passes stereo disparity results combined with input stereo disparity to fourth CDNN layer C4 712. Fourth CDNN layer C4 712 is similarly trained to determine stereo disparity stereo images 702, 704 from scenes similar to stereo training images at appropriately reduced resolution using maximum pooling.

Fourth CDNN layer C4 712 forward propagates stereo disparity results to first de-convolutional deep neural network (DDNN) layer D1 714. First DDNN layer D1 is a deep neural network layer trained by process 900 to upsample by interpolation, for example, stereo disparity results, and de-convolve the stereo disparity results with a convolution kernel based on inverting, at least in part, the convolution function introduced into the stereo disparity results by the CDNN layers 706, 708, 710, 712.

Stereo disparity results forward propagated from fourth CDNN layer C4 712 can be upsampled, combined with stereo disparity results 716 from CDNN layer C3 710 and de-convolved for example, to increase resolution of stereo disparity results before forward propagating stereo disparity results to second DDNN layer D2 718. Upsampling can increase resolution by replicating pixels or by interpolation, for example. Interpolation can be linear or polynomial, or one- or two-dimensional, for example. De-convolution can remove at least some of the structure introduced into the stereo disparity results by the CDNN layers 706, 708, 710, 712.

In like manner to first DDNN layer D1 714, second DDNN layer D2 718 is trained to upsample stereo input disparity results and de-convolve a convolution function based on inverting, at least in part, the convolution function introduced into the stereo disparity results by the CDNN layers 706, 708, 710, 712. Second DDNN layer D2 718 upsamples and combines the stereo disparity results with stereo disparity results forward propagated from the second CDNN layer C2 708 at the proper resolution and de-convolves the stereo disparity results to increase resolution for output to third DDNN layer D3 722.

In like manner to first and second DDNN layers D1 and D2, third DDNN layer D3 722 is trained by process 900 to increase resolution of stereo disparity results by receiving forward propagated stereo disparity results from first CDNN layer C1 at the appropriate resolution to combine with upsampled stereo disparity results forward propagated from second DDNN layer D2 then de-convolved to produce an upsampled and de-convolved stereo disparity results. Stereo disparity results can be converted by simple geometric conversions to estimated depth maps 726. Estimated depth maps 726 can be upsampled to match the resolution of input stereo images 702, 704 and output to computing device 115.

In autonomously piloted mode, computing device 115 can use the estimated depth map to pilot the vehicle by using well-known machine vision techniques to identify regions such as roads and objects such as vehicles in the estimated depth maps 726, for example. In occupant piloted mode computing device 115 can use the estimated depth maps 726 for automatic collision avoidance and parking, for example by identifying regions and objects in the estimated depth maps 726.

Figure 8:
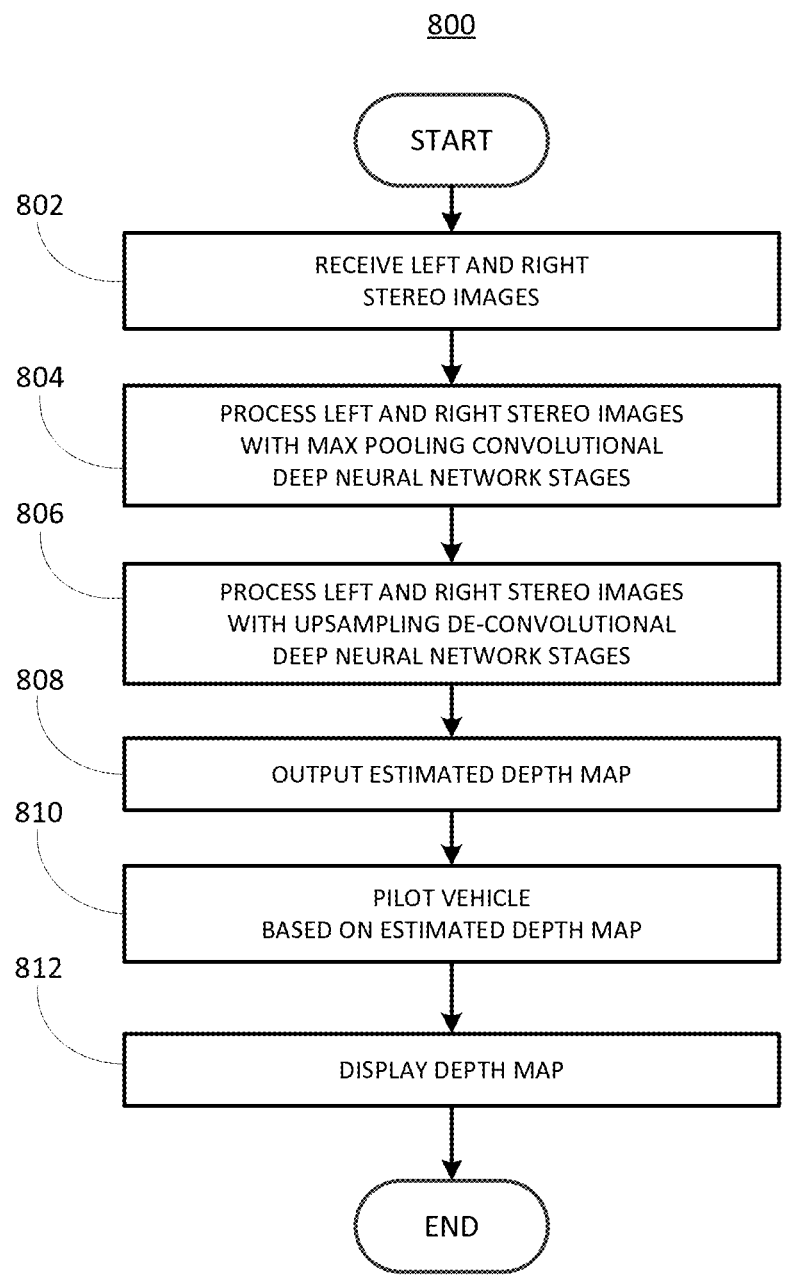
FIG. 8 is a flowchart diagram of a process to determine a depth map for piloting a vehicle with a CDNN in accordance with aspects of disclosed implementations.

FIG. 8 is a flowchart diagram of a process 800 for determining a depth map 726 for piloting a vehicle 110 with CDNN 700 described in relation to FIG. 7. Process 800 can be implemented on vehicle information system 100, inputting information including stereo images 702, 704 from sensors 116, executing instructions and sending control signals via controllers 112, 113, 114, for example. Process 800 includes multiple steps taken in the disclosed order. Process 800 also includes implementations including fewer steps or can include the steps taken in different orders.

Process 800 begins at step 802, where CDNN 700 receives left and right stereo images 702, 704, for example. Left and right stereo images 702, 704 can be input by left stereo camera 602 and right stereo camera 604. At step 804 left and right stereo images 702, 704 can be processed as described above in relation to FIG. 7 by first, second, third and fourth CDNN layers 706, 708, 710, 712 to produce stereo disparity results at reduced resolution. Following this, at step 806 left and right stereo images 702, 704 can be processed as described above in relation to FIG. 7 by first, second and third DDNN layers 714, 718, 722 to upsample by de-convolving convolution functions based on the convolution functions introduced by the CDNN layers 706, 708, 710, 712.

At step 808 CDNN 700 can output estimated depth maps 726 based on left and right stereo images 702, 704 to computing device 115. As discussed above in relation to FIG. 7, estimated depth maps 726 can be upsampled to match the resolution of the input stereo images 702, 704.

At step 810, while vehicle 110 is operating in autonomously piloted mode, computing device 115 can pilot vehicle 110 based on estimated depth maps 726 output by process 800. Vehicle 110 can be piloted based on the estimated depth maps 726 using well-known machine vision techniques to identify regions and objects in the estimated depth map 726 corresponding to roads, vehicles, buildings or foliage, for example, and directing vehicle 110 using controllers 112, 113, 114 to direct vehicle 110 to proceed appropriately.

At step 810 vehicle 110 while operating in occupant piloted mode, computing device 115 can pilot vehicle 110 based on the estimated depth maps 726 by performing pilot assist operations such as collision avoidance or parking. For example, computing device 115 can use well-known machine vision techniques to identify regions in the estimated depth maps 726 corresponding to roads, vehicles, buildings or foliage as above. In the event that an occupant pilots the vehicle in such a fashion that a collision can be predicted based on the estimated depth maps 726, computing device 115 can disable occupant control of vehicle 115 and control vehicle 110 with controllers 112, 113, 114 to safely avoid a collision, for example.

Another example of piloting vehicle 110 based on estimated depth maps 726 can be parking while in occupant piloted mode. Computing device 115 can use well-known machine vision techniques to identify a parking spot and vehicles and objects adjacent to a parking spot in the estimated depth maps 726 and pilot the vehicle into the parking spot safely using controllers 112, 113, 114 without occupant intervention.

At step 812 computing device 115 can display the estimated depth maps 726 on a display 117. Display 117 can be a heads up display, for example, wherein distances to locations in the scene can be displayed on depth maps 726 as discussed below in relation to FIG. 9.

In summary, FIG. 8 illustrates a process 800 for piloting a vehicle based one or more estimated depth maps 726. Estimated depth maps 726 are created by receiving 802 left and right pairs of stereo images 702, 704 to a process 800 that processes 804 stereo images 702, 704 with one or more trained convolutional deep neural network layers with maximum pooling to reduce resolution, then processes 806 left and right stereo images 702, 704 with trained de-convolutional deep neural network layers with upsampling to restore resolution. Process 800 then outputs 808 one or more estimated depth maps 726 to computing device 115. Computing device 115 can pilot 810 vehicle 110 based on one or more estimated depth maps 726 and display estimated depth maps 726 on display 117, which can be a heads up display.

FIG. 9 is a flowchart diagram of a process 900 for training CDNN 700. In order to process 800 left and right stereo images 702, 704 to produce estimated depth maps 726, CDNN 700 can be trained by process 900. Training is accomplished by CDNN 700 first receiving, at step 902, left and right stereo training images. Left and right stereo training images can be selected based on availability of ground truth. Ground truth can include data that indicates the actual range or depth to points in a scene imaged by stereo training images.

At step 904 CDNN 700 can receive ground truth data associated with left and right stereo training images. Ground truth data can be provided by LIDAR, or light radar, which uses pulses of light to determine range or depth to points in a scene. Other techniques can rely on receiving ground truth data from a network via the V-to-I interface 111, for example. This ground truth information can be provided by server computers 120 in the form of map or LIDAR databases or ad hoc networks provided by nearby networked vehicles and networked traffic objects, for example.

Ground truth can be used to train CDNN 700 as discussed above in relation to FIG. 7 by implementing back propagation in CDNN 700. Back propagation can permit CDNN 700 to test stereo disparity and thereby depth map results against ground truth for each maximum pooling CDNN layer 706, 708, 710, 712 and each upsampling DDNN layer 714, 718, 722. In this way CDNN 700 can be trained to determine one or more estimated depth maps 726 for pairs of stereo images 702, 704 similar to stereo training images that minimizes the error between the estimated depth maps 726 and the ground truth.

Stereo images 702, 704 do not have to be identical to the stereo training images for a trained CDNN 700 to determined estimated depth maps 726, but the more different the stereo images 702, 704 become, the less accurate the estimated depth maps 726 may become. In order to maintain accuracy of the estimated depth maps 726 as vehicle 110 proceeds, CDNN 700 is re-trained using new stereo training images and new ground truth.

At step 906 process 900 trains CDNN layers 706, 708, 710, 712, for example, by processing left and right stereo training images and comparing the resulting depth maps to ground truth. Process 900 can program each layer 706, 708, 710, 712 with a variety of available parameter values for depth map determination using maximum pooling and convolutional processing and tests the resulting depth maps against ground truth at each layer 706, 708, 710, 712. Parameters yielding the best results, e.g. parameters that determine depth maps that best match ground truth, are retained and other parameters are discarded.

As the stereo cameras are manually installed on the vehicles, their relative positions and alignments might vary in different vehicles, including rotational and translational mix-alignments of the optical axes. This variation should be taken into account during the deep neural network training; otherwise, the neural network may not perform well on all the vehicles, or its performance might vary due to variations in the stereo camera positions and alignments. Some parameters in the training data sets such as the baseline distance, the relative alignment of the stereo cameras can be made to vary. These variations can help the deep neural networks circumvent local minima during the training, which can increase the robustness of the deep neural networks against variation in stereo camera positions and alignments introduced during camera installation.

Depth map estimation can be easily used with other deep neural networks for acceleration and performance improvement purposes. For instance, deep neural networks has been used to detect and classify objects in a scene; however, depending on the image size, content and quality, the detection and classification process might become inaccurate, instable and slow. To address this gap, a depth map can be a priori knowledge about the distance to the surrounding objects in the scene. In this fashion the detection and classification process can be limited to only to the areas containing the closer objects, e.g. the areas with higher intensities. This strategy accelerates the detection and classification process by limiting the search area rather than searching the entire image.

At step 908 DDN layers 714, 718, 722 can be trained by processing left and right training images and comparing the resulting depth maps to ground truth, for example. As discussed above in relation to FIG. 7, each layer 714, 718, 722 can be provided with a variety of parameter values for depth determination using upsampling and de-convolutional processing and test the resulting depth maps at each layer 714, 718, 722 at the appropriate resolution. Parameters yielding the best results, e.g. parameters that determine depth maps that best match ground truth can be retained and other parameters are discarded.

Computing device 115 according to the process 900 can train CDNN 700 with more than one set of stereo training images and associated ground truth depth map. CDNN can be trained with a plurality of sets of stereo training images and associated ground truth depth maps. Sets of stereo training images and associated ground truth depth maps can be determined by varying the baseline B (FIG. 2) over a predetermined range and sampling stereo training images and associated ground truth and varying the alignment of camera1 206 and camera2 208 over a predetermined range and sampling stereo training images and associated ground truth, for example.

At step 910 CDNN 700 outputs trained deep neural network layers to computing device 115. CDNN 700 can output trained deep neural network layers by outputting the parameters retained for each layer 706, 708, 710, 712, 714, 718, 722 that provided the best results for determining estimated depth maps based on the ground truth to computing device 115, for example. Computing device 115 can store the received parameters in nonvolatile memory and recall them to train a CDNN 700 to determine estimated depth maps 726. A CDNN 700 so trained will then be able to process left and right stereo images 702, 704 that are similar but not identical to left and right stereo training images to determine one or more estimated depth maps 726.

Once trained, a CDNN 700 can determine estimated depth maps 726 for stereo images 702, 704 in real time, outputting 808 estimated depth maps 726 in time for computing device 810 to pilot vehicle 110 based on the estimated depth maps 726, for example. Estimated depth maps 726 can be used by computing device 115 to pilot vehicle autonomously, or provide piloting assistance during occupant piloted mode, for example display augmented reality information on a display 117 which can be a heads up display (HUD) wherein the stereo depth map provides estimated distances to objects, e.g. vehicles, pedestrians, traffic lights. The estimated distances can appear to be projected onto the objects in the scene.

Outputting estimated depth maps 726 depends upon stereo images 702, 704 being similar to stereo training images. As a vehicle is piloted in a scene, the scene can change, and the stereo images 702, 704 will and no longer be sufficiently similar to the stereo training images to be processed by CDNN 700. CDNN can therefore require new training parameters to determine estimated depth maps 726 from stereo images 702, 704. A second CDNN 700 can determine new training parameters using new stereo training images and new ground truth as a background task while first CDNN 700 is determining estimated depth maps using current training parameters. When new stereo images 702, 704 are received 802, first CDNN 700 can use the new training parameters determined in the background by the second CDNN 700 when determining the next estimated depth maps 726. Calculating new training parameters as a background task can permit process 800 to accurately determine estimated depth maps on a continuous and ongoing basis using stereo images 702, 704 as vehicle 110 is piloted through a changing scene.

In summary, FIG. 9 is a process 900 for training a CDNN 700 to determine estimated depth maps 726 based on stereo training images and ground truth. By varying parameters and testing the results at each layer 706, 708, 710, 712, 714, 718, 722, the best parameters for determining estimated depth maps can be retained and stored by computing device 115. CDNN 700 can be trained with the retained parameters by computing device 115 and thereby determine estimated depth maps 726 for stereo images 702, 704 similar to stereo training images. Continuously re-training a CDNN 700 to determine estimated depth maps 726 by determining new parameters as a background task can permit computing device 115 to pilot vehicle 110 through changing scenes in both autonomous and occupant piloted modes.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   inputting and processing first and second stereo images captured by stereo cameras at a same time with one or more deep neural network maximum pooling layers;
   processing the stereo images with one or more deep neural network upsampling layers;
   determining one or more three-dimensional depth maps from the stereo images by solving for stereo disparity in the first and second stereoscopic images with the one or more deep neural network maximum pooling and with the upsampling layers; and
   piloting a vehicle based on the one or more depth maps;
   wherein the deep neural network maximum pooling layers and the deep neural network upsampling layers are based on cross-correlating a first kernel from the first stereo image with a second kernel from the second stereo image to determine stereo disparity to determine the one or more depth maps;
   wherein the deep neural network maximum pooling layers and the deep neural network upsampling layers are trained with training stereo images and associated ground-truth depth maps, wherein the deep neural network maximum pooling layers and the deep neural network upsampling layers are trained with LIDAR data.

2. The method of claim 1 wherein the deep neural network maximum pooling layers are convolutional neural network layers.

3. The method of claim 1 wherein the deep neural network upsampling layers are de-convolutional neural network layers.

4. The method of claim 1 wherein the training stereo images are acquired over a plurality of baseline distances and the stereo camera alignments.

5. The method of claim 1 wherein the one or more deep neural network maximum pooling layers include at least four deep neural network maximum pooling layers.

6. The method of claim 1 wherein the one or more deep neural network upsampling layers include at least four deep neural network upsampling layers.

7. The method of claim 1 further comprising:
   wherein the vehicle is operating in occupant piloted mode; and
   piloting a vehicle based on the one or more depth maps includes assisting an occupant pilot with an augmented reality display.

8. An apparatus, comprising:
   a processor; and
   a memory, the memory including instructions to be executed by the processor to:
      input and process first and second stereo images captured by stereo cameras at a same time with one or more deep neural network maximum pooling layers;
      process the stereo images with one or more deep neural network upsampling layers;
      determine one or more depth maps by solving for stereo disparity in the first and second stereoscopic images with the one or more deep neural network maximum pooling and with the upsampling layers; and pilot a vehicle based on the one or more depth maps;

wherein the deep neural network maximum pooling layers and the deep neural network upsampling layers are based on cross-correlating a first kernel from the first stereo image with a second kernel from the second stereo image to determine stereo disparity to determine the one or more depth maps;

wherein the deep neural network maximum pooling layers and the deep neural network upsampling layers are trained with training stereo images and associated ground-truth depth maps, wherein the deep neural network maximum pooling layers and the deep neural network upsampling layers are trained with LIDAR data.

9. The apparatus of claim 8 wherein the deep neural network maximum pooling layers are convolutional neural network layers.

10. The apparatus of claim 8 wherein the deep neural network upsampling layers are de-convolutional neural network layers.

11. The apparatus of claim 8 wherein the training stereo images are acquired over a plurality of baseline distances and the stereo camera alignments.

12. The apparatus of claim 8 wherein the one or more deep neural network maximum pooling layers include at least four deep neural network maximum pooling layers.

13. The apparatus of claim 8 wherein the one or more deep neural network upsampling layers include at least four deep neural network upsampling layers.

14. The apparatus of claim 8 further comprising:

wherein the vehicle is operating in occupant piloted mode; and piloting a vehicle based on the one or more depth maps includes assisting an occupant pilot with an augmented reality display.

* * * * *